Figure 4:
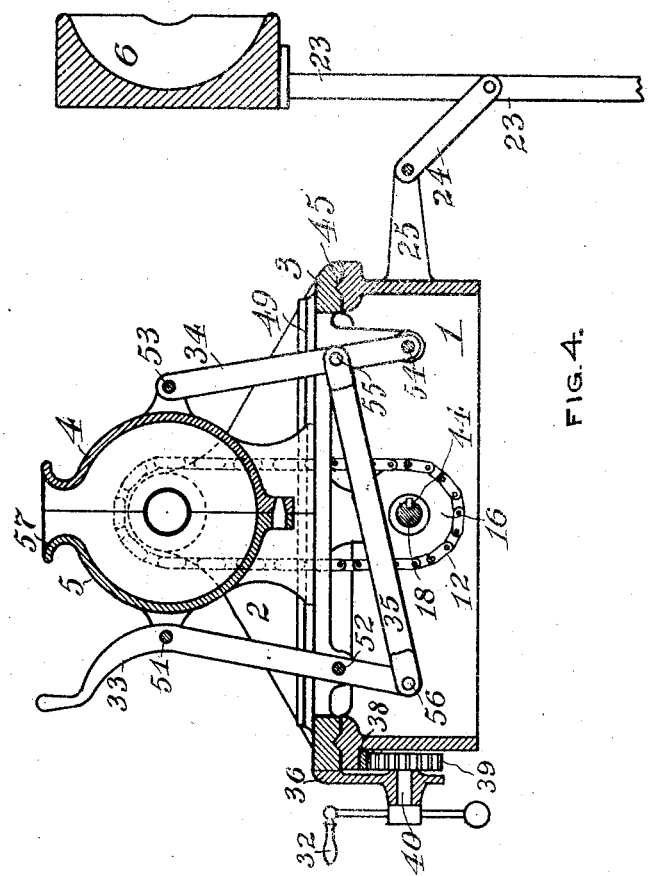

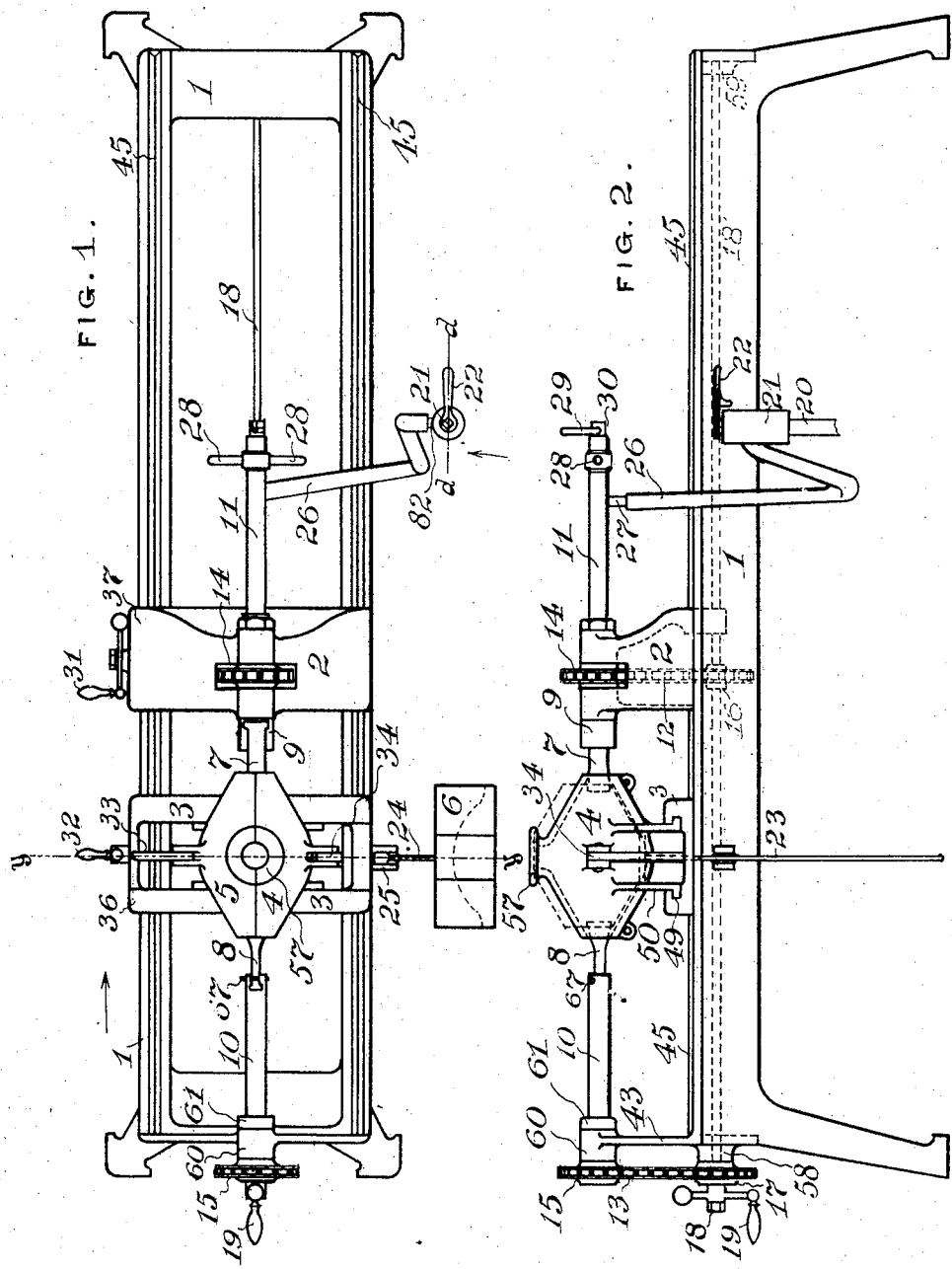

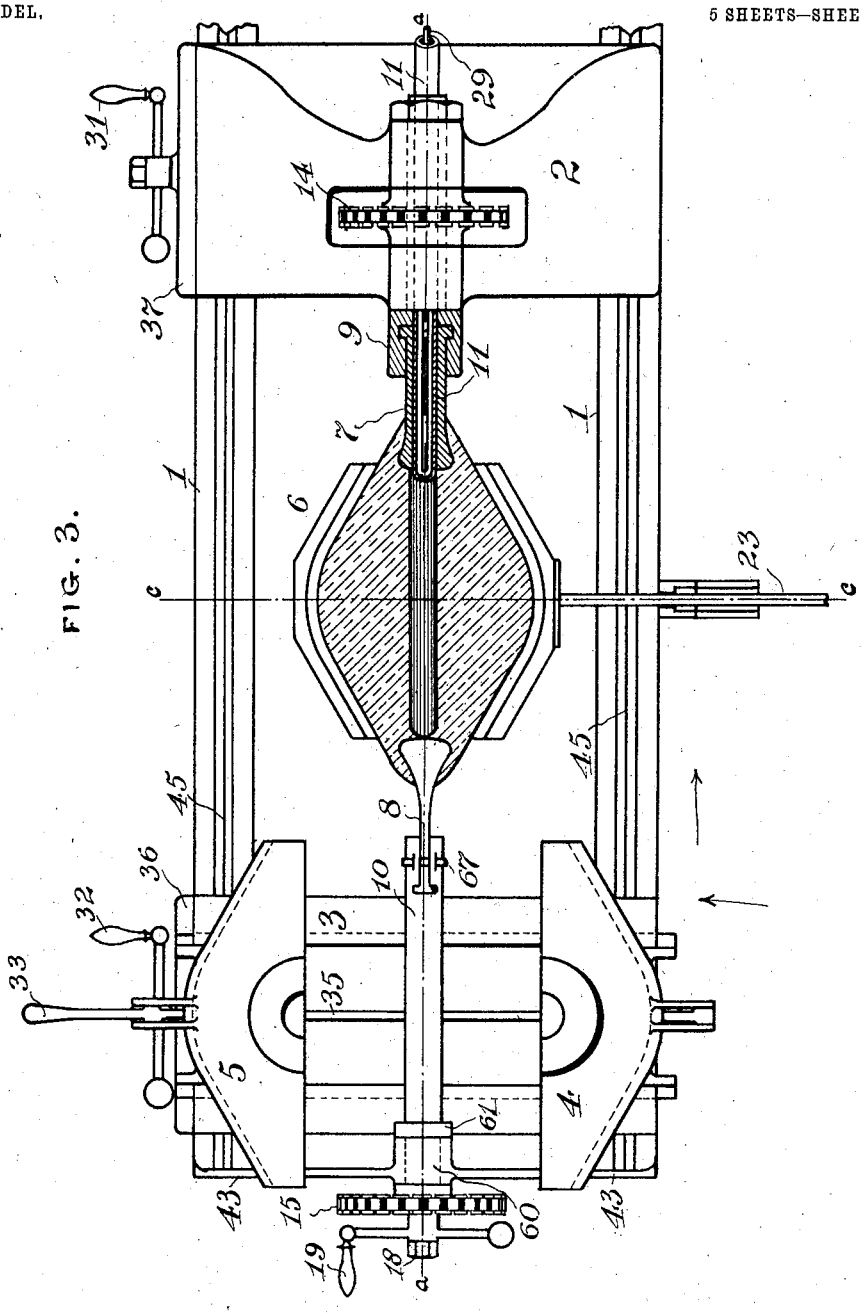

No. 768,034. PATENTED AUG. 23, 1904.
I. W. COLBURN.
GLASS WORKING MACHINE.
APPLICATION FILED MAR. 3, 1903.
NO MODEL. 5 SHEETS—SHEET 3.

WITNESSES:
M. J. Dixon
W. R. Berry

INVENTOR:
Irving W. Colburn,
BY Henry H. Bates,
ATTORNEY.

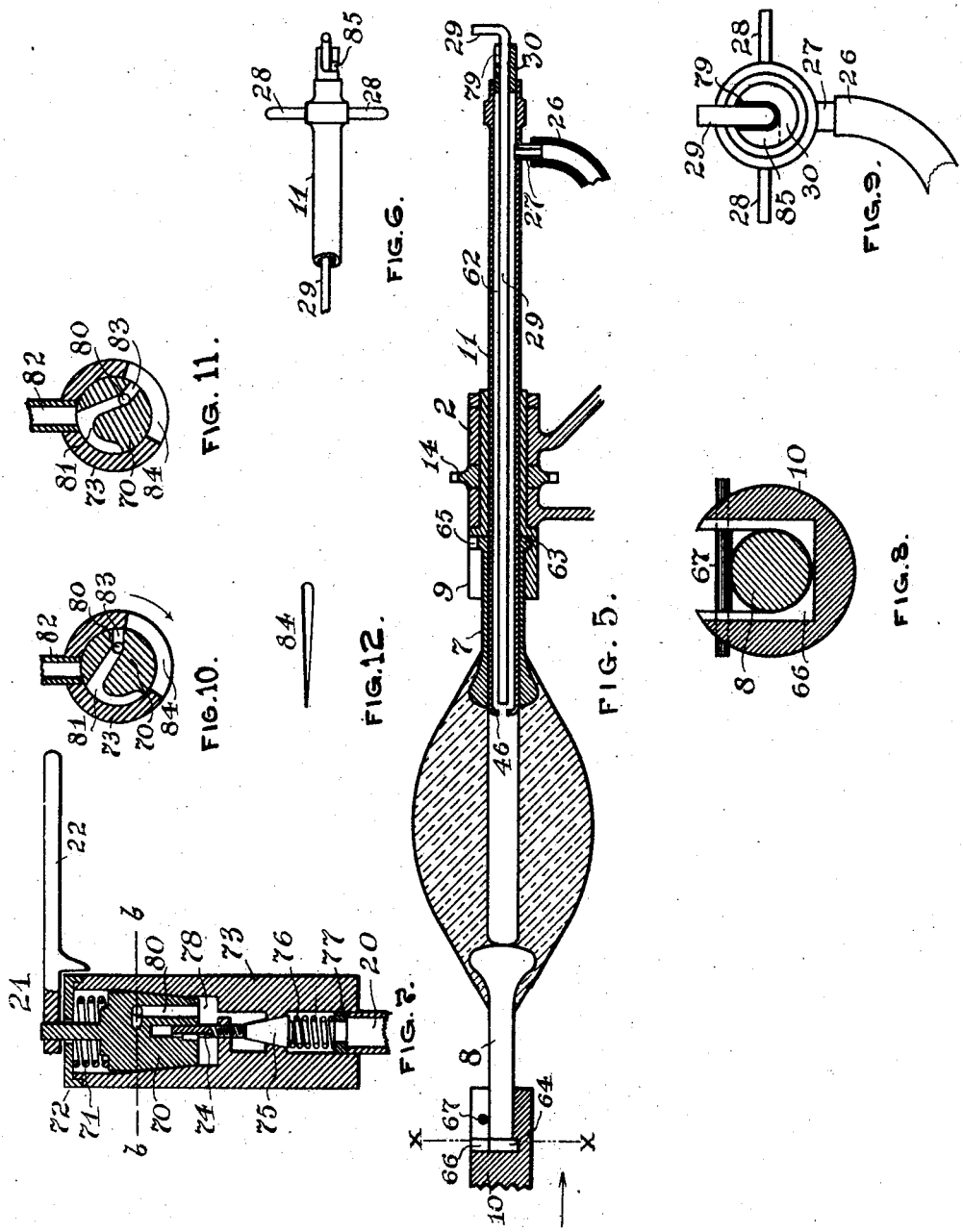

No. 768,034. PATENTED AUG. 23, 1904.
I. W. COLBURN.
GLASS WORKING MACHINE.
APPLICATION FILED MAR. 3, 1903.
NO MODEL. 5 SHEETS—SHEET 5.
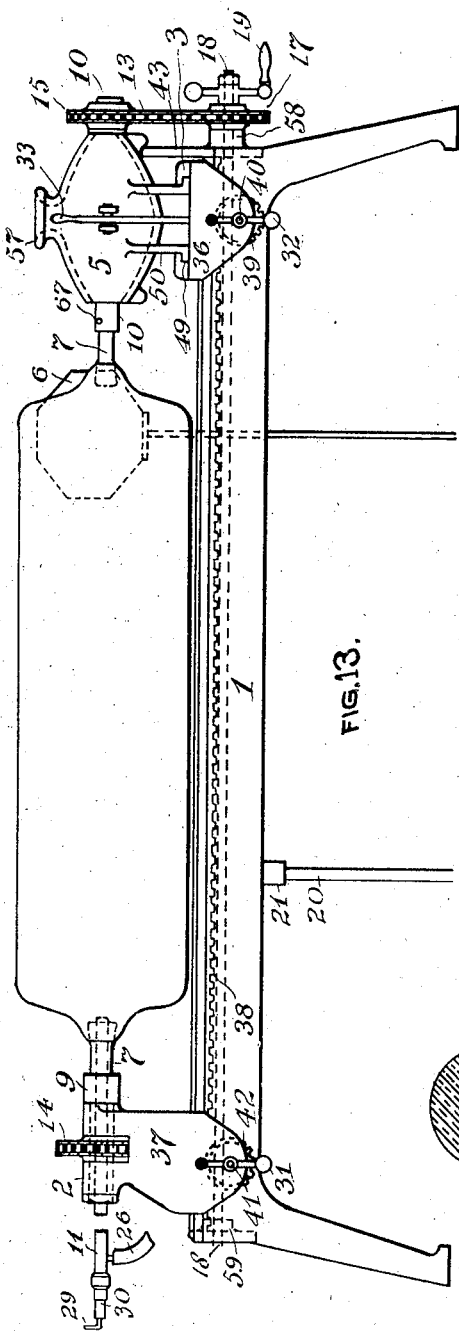
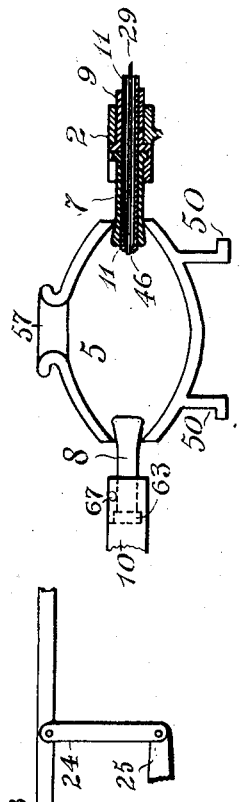
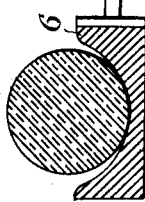
WITNESSES:
M. J. Dixon
W. R. Berry
INVENTOR:
Irving W. Colburn,
BY Henry H. Bates,
ATTORNEY.

No. 768,034. Patented August 23, 1904.

UNITED STATES PATENT OFFICE.

IRVING W. COLBURN, OF FRANKLIN, PENNSYLVANIA.

GLASS-WORKING MACHINE.

SPECIFICATION forming part of Letters Patent No. 768,034, dated August 23, 1904.

Application filed March 3, 1903. Serial No. 145,878. (No model.)

*To all whom it may concern:*

Be it known that I, IRVING W. COLBURN, a citizen of the United States, residing at Franklin, in the county of Venango and State of Pennsylvania, have invented certain new and useful Improvements in Glass-Working Machines, of which the following is a specification.

My invention relates to a novel means or apparatus for producing articles of glass.

The object is to provide a machine by which to facilitate the production of cylinders and spheroids of glass of large size and brilliant surface, the cylinders being adapted to be cut off at the ends, slit open longitudinally, and flattened out into sheets suitable for window-glass. Variously-formed receptacles of large size can also be manufactured by this means, cylindrical and spherical and of modified cylindrical and spherical shapes.

In the drawings forming a part of this specification, Figure 1 is a plan view of the machine. Fig. 2 is a front elevation. Fig. 3 is a plan view, partly in section, illustrating the blocking-operation. Fig. 4 is a sectional view on line $y\,y$ of Fig. 1. Fig. 5 is a sectional view on line $a\,a$ of Fig. 3. Fig. 6 is a plan view of the rear end of the plunger. Fig. 7 is an elevation in section on line $d\,d$ of Fig. 1, showing the air-regulating valve. Fig. 8 is a detail section on line $x\,x$ of Fig. 5, showing the fastening of the stationary holding-head. Fig. 9 is an end elevation of the plunger and accessories enlarged. Fig. 10 is a horizontal section on line $b\,b$ of Fig. 7 of the air-regulating valve, showing ports closed. Fig. 11 is a horizontal section on line $b\,b$ of Fig. 7, showing the air-regulating valve with ports open. Fig. 12 is a projection of the exhaust-port in the regulating-valve case developed on a plane. Fig. 13 is a rear elevation of the machine, showing a cylinder of glass at the end of the operation. Fig. 14 is a view, partly in section, on line $a\,a$, but showing the holding-heads, the plunger, and the rear half of mold. Fig. 15 is a transverse sectional view through the modeling-block on line $c\,c$ of Fig. 3.

Referring to the drawings, 1 is the main frame of the machine, provided with ways 45, on which traverses the tail-stock 2 and the mold-carriage 3. At the rear of the tail-stock is an apron 37, Fig. 13, in which is journaled a shaft 41, having mounted thereon a gear 42 and a crank 31. Said gear 42 is in mesh with a horizontal rack 38, running the whole length of the frame, by means of which and the crank 31 the tail-stock can be traversed back and forth on the ways 45. At the rear of the mold-carriage 3 is an apron 36, in which is journaled a shaft 40, having mounted thereon a gear 39 and a crank 32. Said gear 39 is in mesh with rack 38, by means of which and the crank 32 the mold-carriage 3 can be traversed back and forth on the ways 45.

On the mold-carriage 3 is mounted a divided mold 4 5 of any suitable interior configuration, the one shown being ellipsoidal and in two parts, which, however, might be three or more. It is made, preferably, of metal of suitable thickness and highly polished within. An opening 57 is left in the top of the mold when closed for the admission of a charge of plastic or molten glass. In the mold-carriage 3 are formed the transverse ways 49, into which are movably fitted the feet 50 of the divided mold. A means for moving the said mold members transversely toward and from each other in unison to close and open the mold is shown in Fig. 4, in which hand-lever 33 and lever 34 are pivoted to members 5 and 4, respectively, by pivots 51 53 and to the mold-carriage 3 by pivots 52 and 54. A link 35 is connected to the said two levers at equal distances from the fulcrum-points by pivots 56 and 55, respectively, so that the moving of hand-lever 33 moves both mold members equally in opposite directions. The ends of the mold are open, as shown, and into these the holding-heads 7 and 8 project. The object of these heads is to furnish a means for rotating, stretching, and otherwise manipulating the charge of plastic glass, and to this end they are roughened or otherwise suitably prepared to secure a firm adhesion of the glass thereto. Said heads are removably carried in rotatory spindles 9 10, revolubly mounted on the main frame, spindle 9 being mounted on the movable tail-stock 2, already described, and spindle 10 being mounted on a stationary head-stock 43 in bearing 60, kept in place in the bearing by collar 61. Said rotatory spindles are in axial alinement, and as a means of rotating the same in unison the sprocket-wheels 14 and 15 are mounted on spindles 9 and 10, respectively, said sprocket-wheels being connected by chain-gearing to sprocket-wheels 16 and 17, respectively, wheel 17 being mounted on a horizontal rotary shaft 18, carried in bearings 58 59 on the main frame 1 and wheel 16 being mounted on the movable tail-stock 2, but splined on said rotary shaft 18, (by spline 44, Fig. 4,) so as to rotate with it, but at the same time to be movable longitudinally with the tail-stock, which carries it and the rotatory spindle 9 and head 7, the shaft 18 being parallel with ways 45 to permit such movement. Since both sprocket-wheels 16 and 17 receive rotary motion from the same shaft 18 and have the same ratio of gearing with sprockets 14 and 15, respectively, it follows that the rotary heads 7 and 8 revolve in unison. Rotary motion is imparted to shaft 18 by means of hand-crank 19 or in any other suitable manner. The rotary holding-heads 7 and 8 are made detachable from their respective spindles to admit of their removal therefrom with the finished product, so that they can be detached from the latter. This is the object of the construction illustrated in Figs. 5 and 8, in which are shown the square lugs 63 64 on the said holding-heads 7 and 8, respectively, fitting into square recesses or sockets 65 66 in spindles 9 and 10, by which means they are held from turning in the spindle-sockets, while readily removable, the holding-head 7 being retained in its place by the plunger passing through it when in operation and holding-head 8 being retained in place by removable pin 67.

The spindle 9 and accessories will now be described. This spindle is hollow and contains a tubular plunger 11, highly polished, which is longitudinally movable within the spindle and through the holding-head 7, which is also hollow. The bore 62 of the tubular plunger, which is as large as practicable throughout the entire length of the plunger to afford a passage for air, is contracted at the terminal 46 to a small aperture, to which is fitted a movable rod 29, passing through the entire length of the plunger and out through the plug 30, Figs. 5, 6, and 9. In said plug 30 there is a slot 79, having a lateral slot 85, into which the bent end of the rod 29 can first be pushed forward until the rod stops the aperture 46, when the rod can be locked in position by giving the bent end a quarter-turn until it rests in said slot 85. Handles 28 are provided, by which the smooth plunger can be pushed into the charge of plastic glass until it meets holding-head 8.

It now remains to consider the air-supply by which the plastic charge is expanded during rotation and formation. This supply is furnished from an outside source of compressed air through pipe 20, air-regulating valve 21, flexible tube 26, connected with the air-valve and the passage 62 in the plunger by nipples 82 and 27, respectively. The air-valve is shown in detail in Figs. 7, 10, 11, and 12. It is designed to furnish a variable pressure of air at will, regulable within delicate limits, and also a variable quantity. 73 is the valve-case, 75 the admission-valve held against its seat when there is no air-pressure by the spring 76, supported in place by abutment-ring 77. 78 is an air-chamber, at the top of which is the rotary plug 70, operated by hand-lever 22 and held in its conical seat by spring 71, confined in place by cap 72. In the plug 70 is the vertical port 80 and the lateral ports 81 83, communicating, respectively, with nipple-passage 82 and tapered passage 84 to the external air, the latter cut in valve-case 73. In plug 70 is splined, so as to be longitudinally movable and at the same time turn with the plug, the screw-stem 74, threaded with a nut in casing 73 and bearing on admission-valve 75, so as to open the same when the plug 70 is turned by handle 22 in the direction of the arrow in Fig. 10, so as to bring air-ports 81 83 into operation. By this means the screw 74 is advanced so as to press on valve 75, thereby admitting air under pressure to chamber 78. As the lever 22 is continuously turned the air finds an outlet through ports 80 81 83, dividing here, so that a portion passes through port 81 to nipple 82 and plunger-passage 62, and a portion escapes to the open air through tapered port 84. As lever 22 continues to advance, the valve 75 admits air more freely, less air escapes by the tapered port 84, and, finally, the full amount under maximum pressure goes to plunger-passage 62 and exerts its expansive force upon the plastic charge of glass. It is thus seen that the air-valve 21 by means of a single regulating hand-lever controls at the same time the quantity of air delivered and the pressure at which it is delivered.

In Figs. 3, 4, and 15 is shown a device for modeling and smoothing the rotating charge of plastic glass, removing seams and unevenness, marvering the mass into proper shape and consistency, and distributing the heat thereof evenly through the same, so as to facilitate the subsequent operations of expanding, stretching, and manipulating. The device consists, primarily, of a block 6, preferably of metal, but which may be of wood or other suitable material, which after proper treatment for application to the plastic mass of glass by bringing it to a suitable temperature so as not to chill the same and by suitable lubrication of the contacting surface is brought to bear against the under side of the rotating mass, as shown in Figs. 3 and 15. Said block is preferably made fast on a handle 23, which is pivotally connected by a link 24 with bracket 25 on the main frame. This arrangement allows the block to be handled freely, while securing it to the frame and permitting it to be turned out of the way when not in use.

Operation: Taking the machine at rest, with the tail-stock 2, mold-carriage 3, and mold-halves 4 and 5 in the position shown in Figs. 1 and 2, the mold-halves having been previously heated to a suitable temperature for the proper manipulation of glass, so as not to chill the charge of plastic glass when the same is poured into it, on the one hand, or adhere to it, on the other, the holding-head 8 is secured in its socket in spindle 10 in the manner shown, its holding end projecting within the closed mold. The holding-head 7 is placed in its socket in spindle 9 with its holding end projecting within the closed mold opposite to holding-head 8. The plunger 11 is then pushed through the tubular holding-head to the position shown in Fig. 14, and the plug-rod 29 inside of the tubular plunger is pushed forward, so as to close the aperture in the end of the plunger, and is locked by a quarter-turn given to the bent end thereof projecting into slot 79 and recess 85. The air-valve 21 is closed. Molten or plastic glass is now brought to the machine by any of the means or appliances usually employed for handling melted glass from glass-furnaces, and a sufficient charge is poured into the closed mold. The hot glass quickly adheres to the prepared or roughened holding-heads on each side, but does not stick to the finely-polished interior surface of the mold. The charge is allowed to stand a few seconds in the mold until it has become sufficiently stiff to submit to the block treatment while still plastic. The mold is now opened by pulling on hand-lever 33, which separates the two halves sufficiently to allow the plastic charge to pass out. The mold-carriage 3 is then run back to the position shown in Figs. 3 and 13 by means of crank 32 and rack and gear 38 39. As soon as the plastic mass is freed it is put in rotation by turning crank 19 on shaft 18, which rotates the two holding-heads 7 and 8 in unison by the mechanism hereinbefore described. The block 6, first properly treated, is now brought to the position shown in Figs. 3 and 15 beneath the rotating plastic mass to model and smooth it, as before described. While on the block the plunger 11 is forced into and through the plastic mass. The rod 29 is then unlocked and withdrawn from the terminal aperture, and the plunger is then withdrawn from the charge, leaving an aperture therein, as shown in Fig. 5. The block 6 is now removed. Compressed air is admitted through the plunger by means of air-valve 21, at first at sufficient pressure to slightly expand the plastic mass, then in sufficient volume and pressure to gradually bring it to the proper size and shape while the mass is still rotating, the tail-stock 2 being gradually moved away by means of crank 31 and connected mechanism to aid in bringing the rotating and expanding mass to the desired size and configuration. When this is attained, the air-current is shut off and all motions are stopped. It is possible by varying these coöperative motions to vary the results indefinitely and produce a great variety of forms, both useful and ornamental, since the speed of rotation, the rate of stretching, and the volume and pressure of internal expansion being under separate control can be varied independently without practical limit. The time of piercing the glass by the plunger can also be varied with variety of result, and the movement of the holding-head 7 can be in either direction, with alternations or stoppages or variations of speed at any stage, as desired, securing great variety of result, especially in conjunction with a cooling-current of air applied outside at different points, which stops or arrests the rate of expansion at that point, while permitting the glass to expand and stretch at other points without restraint. Hand manipulation may also be applied simultaneously, as in hand glass-blowing, and thus almost any conceivable variety of shape of revolution can be obtained, as in a lathe. The finished article is removed by drawing back plunger 11 from the holding-head 7 and removing pin 67 from spindle 10, thus releasing the two holding-heads, when the article, with the heads, is lifted from the machine, and the heads are separated by any of the well-known methods common to the art. The machine is now ready for another cycle of operations.

I claim and desire to secure by Letters Patent—

1. A divided mold, means for horizontally separating the members simultaneously, and for closing the same, an aperture for filling purposes, and openings in the ends.

2. A divided mold, open at the ends, means for separating the parts simultaneously, and for closing the same, rotatory holding-heads for plastic glass in axial alinement, projecting within the opposite open ends of the mold, and means for rotating said holding-heads in unison.

3. A mold open at both ends, rotatory holding-heads for plastic glass projecting within said open ends, in axial alinement, and means for axially piercing the plastic charge while held between said holding-heads.

4. Two rotatory holding-heads in axial alinement, one tubular, means for casting a mass of plastic glass between and in secure adhesion to said holding-heads, whereby the glass may be rotated, a movable hollow plunger, having a contracted terminal aperture, mounted in the tubular holding-head, to be thrust axially into said plastic rotatory mass, to meet the opposite holding-head, and means for stopping and unstopping the terminal aperture of said plunger from the outside thereof at will.

5. A mold, open at both ends, having a filling-aperture, rotatory holding-heads for plastic glass projecting within said open ends in axial alinement, one of said holding-heads being tubular and movable lengthwise, a movable hollow plunger fitted within said tubular holding-head, terminally apertured, means for opening and closing said aperture, said plunger being constructed and adapted to be thrust into the plastic charge lengthwise centrally down to the opposite holding-head.

6. Two rotatory holding-heads for plastic glass in axial alinement, one of said heads being tubular, a hollow plunger fitted within said tubular holding-head, movable longitudinally therein and having a terminal aperture smaller than the bore of the hollow plunger, a rod movable within said hollow plunger, adapted for stopping said terminal aperture, extending beyond the said plunger at the outer extremity thereof, and locking means for keeping said rod in place when forming a stop for said terminal aperture.

7. Two rotatory holding-heads for plastic glass in axial alinement, means for casting a charge of plastic glass between and in firm adhesive contact with said holding-heads, means for rotating said heads and plastic charge in unison, a movable block, intermediate of said holding-heads, for shaping, smoothing and marvering said plastic casting while being rotated, and means for manually operating said block.

8. Two rotatory holding-heads for plastic glass, in axial alinement, means for casting a charge of plastic glass between and in firm adhesive contact with said holding-heads, means for rotating the said heads and casting in unison, means for expanding said casting by internal pressure while under rotation, and means for separating said holding-heads while rotating, whereby said plastic casting is elongated and stretched at the same time that it is being expanded.

9. Two rotatory holding-heads for plastic glass in axial alinement, means for casting a charge of plastic glass between and in firm adhesive contact with said holding-heads, means for rotating said heads and casting in unison, means for separating said heads while in adhesive engagement with said casting, to stretch and elongate the latter, and means for introducing compressed air in regulated volume and pressure within said plastic casting while held between said rotatory heads.

10. Two rotatory spindles in axial alinement, two holding-heads for plastic glass detachably secured to said spindles, also in alinement, means for separating said spindles and holding-heads, and for rotating them in unison, and means for casting a charge of plastic glass in firm adhesive contact with said holding-heads, whereby the said charge may be rotated and stretched by movements imparted to said holding-heads, the product being removable from the machine when finished, by detachment from said heads.

11. A divided mold for plastic glass, a movable carriage therefor, transverse ways on said carriage on which said mold members are transversely movable, and lever connections whereby said mold members are simultaneously separated or brought together.

12. Two rotatory holding-heads for plastic glass, in axial alinement, one of said heads being tubular, a hollow plunger fitted within said tubular holding-head, having a terminal aperture, means for stopping and opening said aperture at will from the outside of the tubular plunger, means for advancing and retracting said plunger through the plastic charge held between said holding-heads, means for introducing compressed air within said tubular plunger, for expanding the plastic charge between said heads, and an air-valve for controlling and regulating the admission of compressed air both as to quantity and pressure.

13. Two rotatory holding-heads for plastic glass in axial alinement, means for casting a charge of plastic glass in firm adhesive contact with said holding-heads, means for rotating said heads with their plastic charge, in unison, means for separating said heads while rotating with their plastic charge, whereby the latter is elongated, a hollow plunger axially located within one of said holding-heads and movable lengthwise therein, for piercing the plastic charge, means for introducing compressed air within said plastic charge through said hollow plunger, for expanding said charge; and an air-valve, having an admission-valve for regulating the quantity of air admitted, and a divided port, one branch conveying air to the hollow plunger, and the other branch communicating with the external air by a variable opening, whereby the pressure of the air within the plastic charge is regulated and controlled.

In testimony whereof I have signed my name to this specification in presence of two witnesses.

IRVING W. COLBURN.

Witnesses:
 FRED D. OILER,
 ROBT. F. GLENN.